Feb. 4, 1941.  F. R. WILBER  2,230,420
DRIVE MECHANISM FOR SHAKER CONVEYERS
Filed April 23, 1938  4 Sheets-Sheet 1
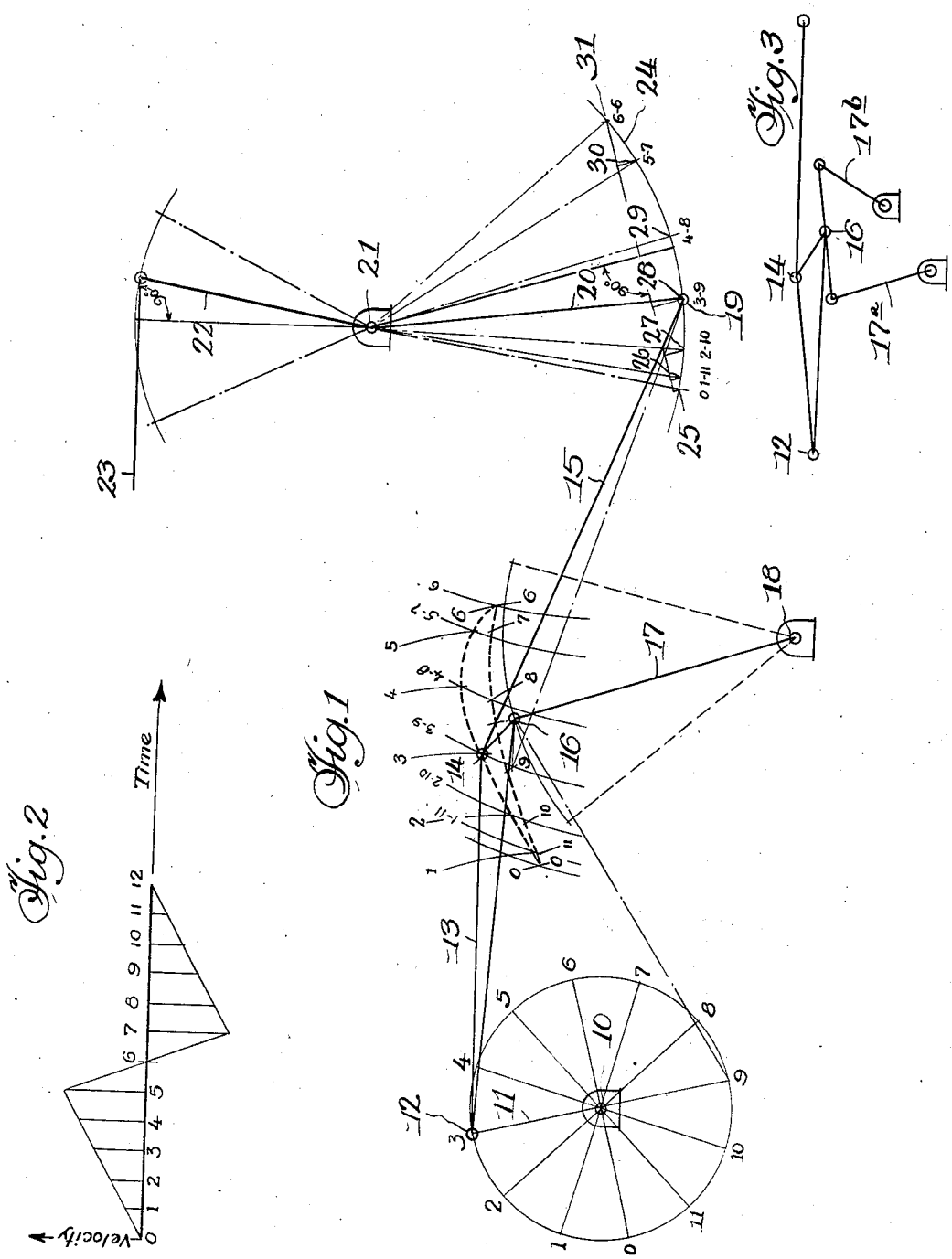

Feb. 4, 1941.   F. R. WILBER   2,230,420
DRIVE MECHANISM FOR SHAKER CONVEYERS
Filed April 23, 1938   4 Sheets-Sheet 2

Witness
Chas. E. Koush

Inventor
Fred R. Wilber,
Chritton, Wiles, Davies, Hiruell & Davis
Attys

Feb. 4, 1941.  F. R. WILBER  2,230,420
DRIVE MECHANISM FOR SHAKER CONVEYERS
Filed April 23, 1938   4 Sheets-Sheet 3
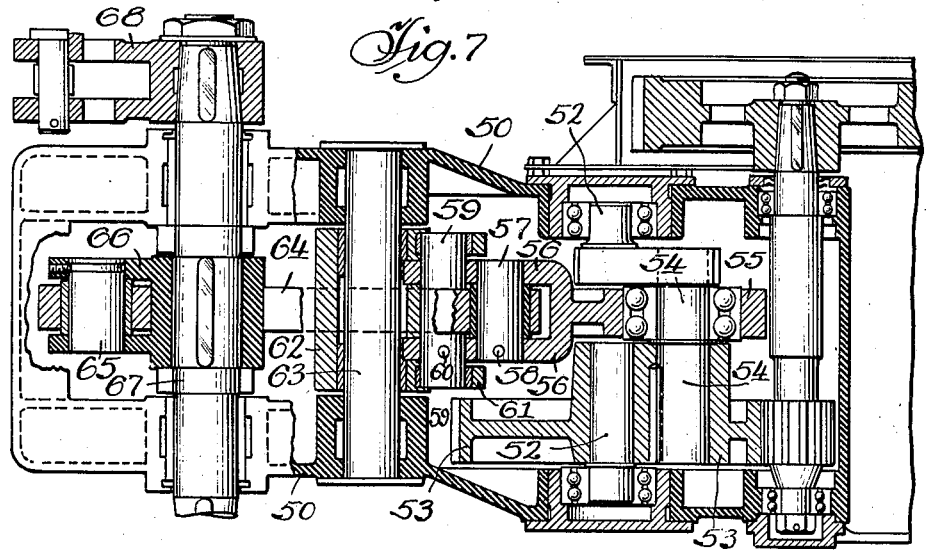
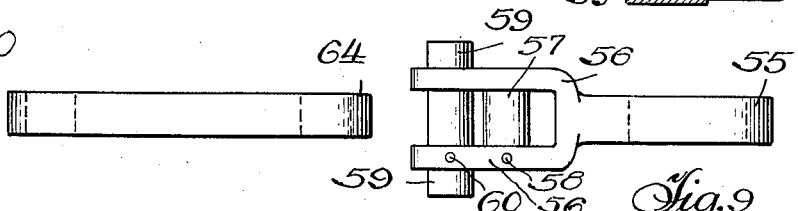
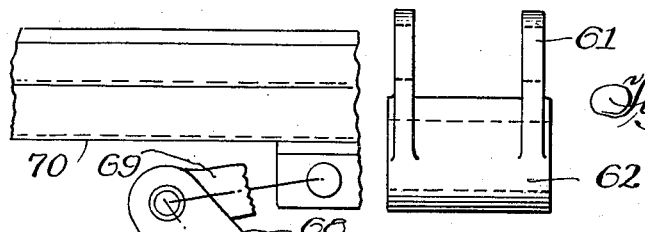
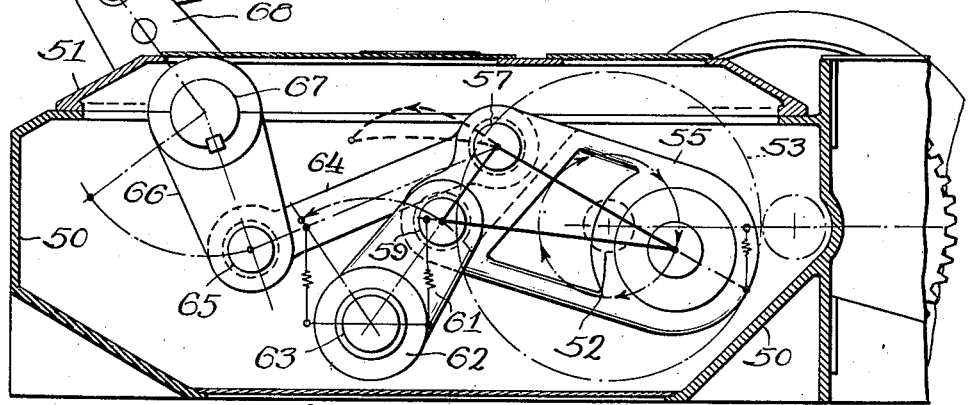
Inventor
Fred R. Wilber Feb. 4, 1941.                F. R. WILBER                2,230,420
                 DRIVE MECHANISM FOR SHAKER CONVEYERS
                 Filed April 23, 1938         4 Sheets-Sheet 4
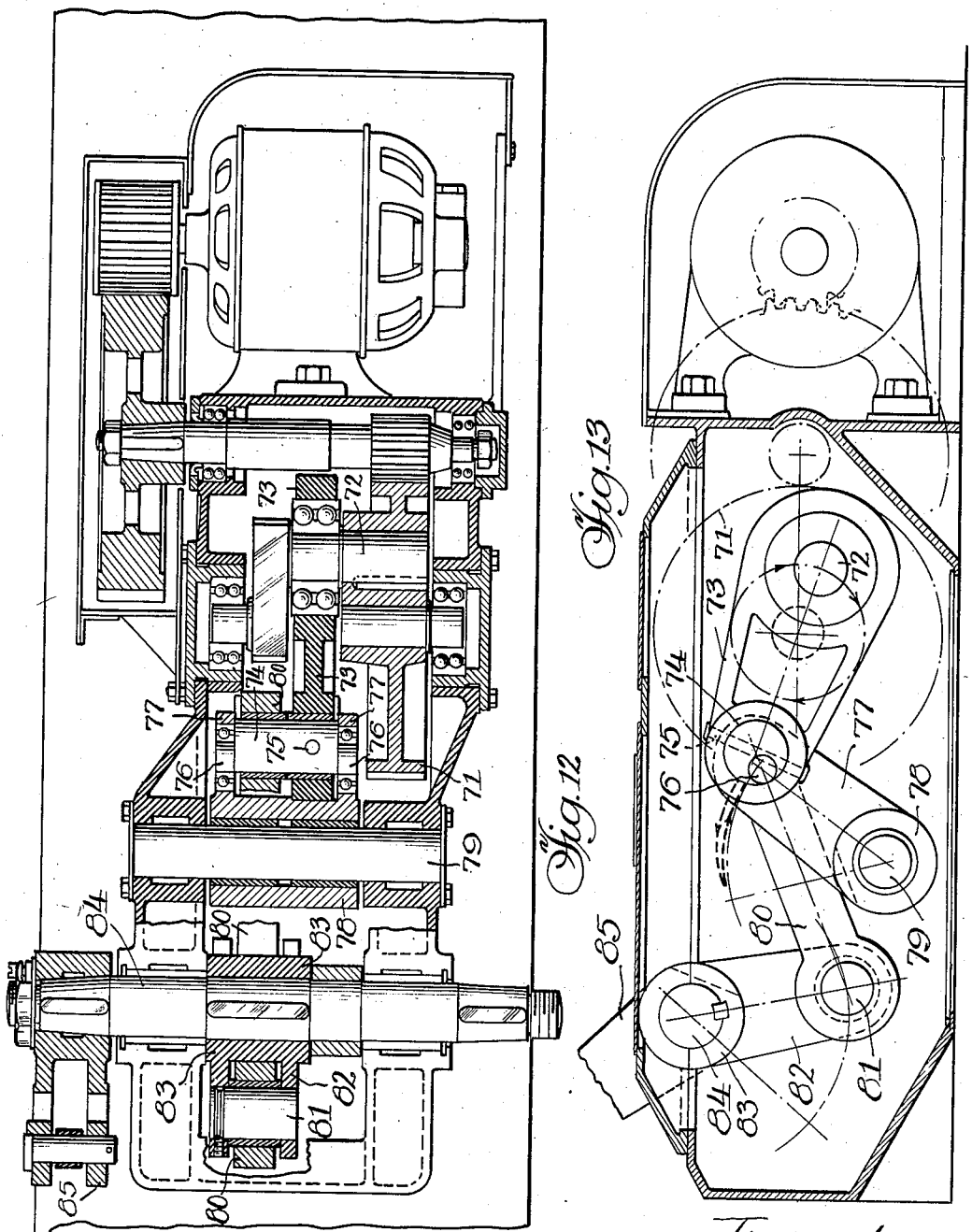
Witness:                                      Inventor,
                                          Fred R. Wilber,
                        Chritton, Wiles, Davies, Hirschl & Dawson Attys.

Patented Feb. 4, 1941

2,230,420

UNITED STATES PATENT OFFICE 2,230,420

DRIVE MECHANISM FOR SHAKER CONVEYERS

Fred R. Wilber, Denver, Colo., assignor, by mesne assignments, to Goodman Manufacturing Company, Chicago, Ill., a corporation of Illinois Application April 23, 1938, Serial No. 203,913

7 Claims. (Cl. 74—40)

This invention relates to drive mechanism, and more particularly to drive mechanism for a reciprocating or shaker conveyer.

Numerous attempts have been made heretofore to produce a shaking movement which approaches what is assumed to be an ideal time-velocity diagram, i. e. one which is best adapted for the particular conditions at hand. For example, different movements are desired when the material, coal. for example, is to be moved downgrade, or on the level, or slightly upgrade.

In the usual driving mechanism for such conveyers, rotary motion is changed to reciprocating motion by a crank, a connecting rod or link or links and a rocker arm or arms arranged at various angles with respect to each other. In such combinations of these parts as have been used heretofore, the return movement of the crank necessarily produces a different acceleration and retardation of certain of the connected members than during the forward movement. The ideal movement and hence the corresponding ideal curve for most cases is substantially the same on the return stroke as on the forward stroke but reversed as to sequence.

Some of the driving mechanisms approach fairly well the ideal conditions during one-half of the cycle, as for example on the forward stroke, but depart therefrom during the other half of said cycle, and it has been found very difficult to design mechanism to approach more nearly the desired result on one stroke without making it less desirable on the other stroke.

The general object of this invention is to provide an improved drive mechanism in which the two half cycles, i. e. the forward and backward movements of the conveyer troughs, can be changed, one substantially independently of the other, so as to more nearly approach ideal conditions than does existing apparatus.

As contributory to this general object, it is a further object of the invention to provide an improved method of determining the exact path of movement required of certain intermediate parts of the drive, by laying out the desired linear movements as developed from a time-velocity diagram, and then tracing the movements backwardly through the linkage and forwardly from the crank arm through other parts of the linkage to arrive at the said exact path of movement.

Another object of the invention is to provide improved mechanism, of the character described above, which is capable of many modifications.

An additional object is to provide shaker equipment which is of sturdy construction and is positive in action.

Other features and advantages will be apparent from the following specification and the drawings, in which:

Fig. 1 is a diagrammatic view of one arrangement embodying the invention;

Fig. 2 is an assumed ideal time-velocity diagram;

Fig. 3 is a modification of part of Fig. 1;

Fig. 7 is a plan view of a commercial embodiment of the invention with the top of the housing removed;

Fig. 8 is a side view thereof, somewhat diagrammatic;

Figs. 9, 10 and 11 are views of certain parts shown in Figs. 7 and 8;

Fig. 12 is a top plan view of a somewhat different commercial form of the invention;

Fig. 13 is a side view thereof, somewhat diagrammatic;

Figure 4:
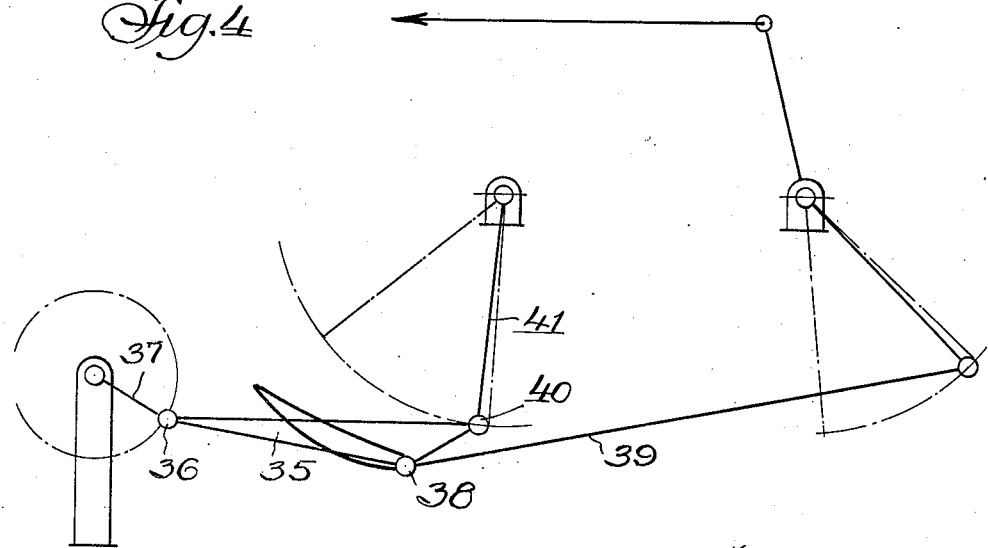
Fig. 4 is a schematic diagram of another arrangement embodying the invention.

Shaker conveyers are in the form of a series of connected troughs, which may be hung from above or otherwise supported and which are reciprocated longitudinally in such a way that the material slides or creeps in the desired direction. That is, the time-velocity curve of the trough motion is such that the trough is accelerated relatively slowly in the direction it is desired to convey the material until the maximum velocity is reached, whereupon the trough is decelerated rapidly and reversely accelerated rapidly, so that the material slides along the trough a short distance in the desired direction during this phase of the trough movement, which includes the reversal of its direction. Then the trough more slowly decelerates (in a direction opposite to the travel of the material) until it comes to rest, during which time the material also comes to rest. Immediately thereafter said trough reverses its movement and again slowly accelerates forwardly, so that there is little or no backward slide of the material. The back and forth movement takes place rapidly, usually a little faster than one complete reciprocation per second.

In order to achieve this desired time-velocity relationship, the trough, when moving forwardly, should accelerate at a substantially constant rate through a large proportion of its length of travel, then decelerate to zero in a relatively small percentage of its length of movement. The backward portion of the motion cycle is the opposite.

An assumed ideal time-velocity diagram is illustrated in Fig. 2, where it will be seen that the trough takes five-sixths of its forward motion time to uniformly accelerate to peak velocity then uniformly decelerates to zero velocity in one-sixth of the total time of forward movement.

During the backward movement, which follows immediately, it reversely accelerates uniformly to peak velocity in one-sixth of the time of said backward movement, and then occupies the rest of the time in uniformly decelerating to zero. Where the troughs are arranged slightly up grade, the peak of the curve shown in the upper half of the time-velocity diagram will be shifted somewhat to the right and the peak below the line will be correspondingly shifted somewhat to the left. If the material is to travel down grade, the upper peak may be shifted to the left and the lower peak to the right.

Referring more particularly to the diagrammatic showing of one arrangement of my invention, illustrated in Figure 1, the rotating shaft 10 is adapted to be power driven by any convenient means, such as an electric motor, and to rotate with it, at a uniform rate of movement, the crank arm 11. The end of the crank arm is pivotally connected at the point 12 to one end of a connecting member or pitman 13, this member being connected at the point 14 to one end of a connecting link 15, and at the point 16 to the upper end of a rocker member or arm 17 pivotally mounted at 18. The other end of the link 15 is pivotally connected at 19 to the lower end of a rocker arm 20 pivotally mounted at 21 and moving therewith the drive arm 22 connected by appropriate means 23 to the conveyer trough, not here shown, to achieve reciprocating movement thereof, upon rotation of the crank arm 11. Thus the link 15 is connected to the pitman 13 which drives it, rather than to the rocker arm 17.

It will be seen that the two connecting points 14 and 16 of the member 13 are spaced from each other, and, with the point 12, are arranged at the apices of a triangle. The point 16 is further removed from the point 12 than the point 14; and is spaced out of line with respect to these two points. Because of this arrangement, the point 14 goes through a complex movement such that it travels one path upwardly and to the right, as illustrated in dotted lines, during movement of the crank arm 11 in the upper half of its circle; and another and different return path downwardly and to the left during return movement of the crank arm 11 in the lower half of its circle. The point 14 is thus not only moved forwardly and backwardly, but also oscillates up and down about what may be termed the moving fulcrum point 16.

Proper arrangement of the spacing of these points, and of the location and length of the arm 17 or other guiding means for the point 16, enables each of the paths to be chosen in such a way as to obtain a more nearly ideal time-velocity relationship not only during forward movement of the trough, but also during reverse movement thereof. In other words, the special pitman or triangular arrangement which may be called the "flyer," guided at the end remote from the crank, compensates for the discrepancies, in the back and forth movement, which are due to the changing angular movement of the usual pitman or connecting rod, as the crank pin follows the upper and lower halves of the circle.

The said two paths can be determined, for example, by laying out on the arc 24 travelled by the point 19, the desired distances of travel corresponding to different portions of the movement, and correlating these with corresponding positions of the point 12 on the end of the crank arm 11. Since the point 19 is positively tied to the connecting trough through operative connecting means, movement of the point 19 at the desired rate insures similar movement of the trough. Inasmuch as the total distance covered during any particular time interval is the integral of the velocity curve, the projections of portions of the arc 24 corresponding to the time portions of the time-velocity diagram of Figure 2 on to the line representing the relative path of the trough, should bear to each other the ratio of the areas under the curves corresponding to these particular portions. That is, the point 25 on the arc would correspond to the zero point on the time curve; the point 26 to the one-unit point; the point 27 to the two-unit point; the point 28 to the three-unit point; and point 29 to the four-unit point; the point 30 to the five-unit point; and the point 31 to the six-unit point. An arc struck from the point 25 with a length equivalent to the link 15 and an arc struck from the point 12 at its furthest left position, with a radius equal to the length between the point 12 and the point 14, would intersect at a point which should be one end of the paths of movement of the point 14; similarly, arcs struck from the point 31 and the furthest right position of the point 12 would intersect at the ideal furthest right position of the paths of the point 14. All intermediate points, however, would have two different points of intersection, one lower than the other, since the point 12 representing the end of the crank arm might be in corresponding positions in either the upper half or the lower half of its circle of travel. Such arcs would then define the two ideal paths of travel of the point 14, as illustrated in dotted lines. The position of the point 16 with respect to the point 14 is then chosen such that the lever arm ratio between the various points achieves the desired drop in distance between the upper and lower ideal paths of the point 14 as the point 12 passes through the upper or lower portions of its arc; and the guide means is so chosen and arranged as to make the point 16 travel in a fixed path such that the point 14 corresponds to the desired path.

The distance between the upper and lower paths varies in different cases, as will be seen in Figs. 8 and 13 representing two commercial embodiments of the invention and hereinafter described. Also, it has been found in certain cases that the upper and lower paths may coincide. The paths are then substantially on a straight line. The points 14 and 16 merge into one point and the guiding means may be any device that produces straight line motion.

It will be apparent that a characteristic feature of this invention, in most instances, is the provision of two different paths for the point 14, one for forward motion thereof and the other for return motion thereof. The point 14 may be operatively connected to the trough to be reciprocated in any desired way, either directly by the link 15, or by the preferred form of intermediate linkage as shown; and the point 16 may be constrained to follow the desired fixed path by any appropriate guide means, whether it be a cross head or the rocker arm arrangement shown, or other means.

As shown in Fig. 3, the rocker arm 17 may be replaced by two rocker arms 17ᵃ and 17ᵇ or by other combinations of links similar to a Watt motion.

The invention may be embodied in a number of different modifications or arrangements, in which the two separate paths are achieved and in which the connecting member has three spaced points of connection to other portions of the drive. One such illustration is shown diagrammatically in Fig. 4. Here the connecting member or pitman 35 is connected at the point 36 to the crank arm 37, at the point 38 to the connecting link 39, and at the point 40 to the guide means 41, here shown as a rocker arm pivoted at the upper end. Although the positions of the rocker arms and the relationships of the arcs they travel have been changed, the triangular spacing of the points 36, 38 and 40 is retained, and the point 38 is constrained to follow two different paths during forward and reverse movements, as is illustrated in dotted lines. Calculation of the resultant trough movement with this drive arrangement will show that it also achieves more nearly an ideal time-velocity curve on both the forward and reverse movements thereof.

Figure 5:
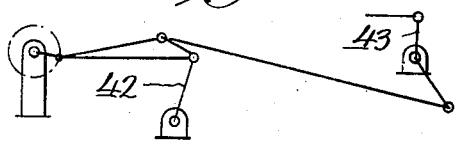
Figs. 5 and 6 are further schematic diagrams of other arrangements.

In the modification shown in Fig. 5 the first rocker arm 42 is pivoted at the bottom, as in Fig. 1, but the lower part of the pivoted driving arm 43 has a different angle with a vertical line, than that shown in Fig. 1.

Figure 6:
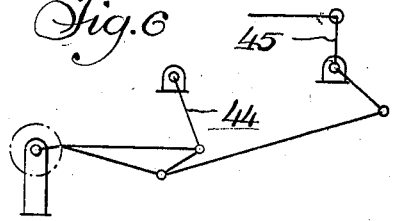

In Fig. 6 the rocker arm 44 is pivoted at the top, somewhat as in Fig. 4, but the driving rocker arm 45 is, in this case also, arranged at a different angle with respect to the connecting link and to the trough.

In the commercial embodiment of the invention shown in Figs. 7 and 8, the mechanism is shown enclosed in a suitable housing 50 with the upper part 51 removable to render the interior accessible. The rotatable shaft 52 is mounted in ball bearings in the side walls of the housing, and is driven by a train of gears from a motor or other suitable source of power. Said shaft has a gear 53 mounted thereon which carries a laterally extending pin 54 on which is mounted one end of the connecting rod or pitman 55, by means of ball bearing raceways. The other end of said rod is bifurcated at 56, 56, and in it is mounted a pin 57, fixed against rotation by a locking pin 58.

Said rod 55 also carries second pin bearings 59, 59, a little below said first pin, and locked in place by a pin 60. The projecting pin ends extend laterally into openings in rocker arms 61, which are united at the bottom by the cylindrical member 62 which rocks about the shaft 63.

A connecting rod or link 64 is connected at one end to the pitman by means of the pin 57 and at the other end to the pin 65 which is mounted in rocker arms 66, fast on the shaft 67. It will be seen that the pitman 55 is directly connected to the connecting rod or link 64 through the pin 57. Said pitman also rocks the rocker arms 61 through the direct connection of the pin 59. Thus said rocker arms guide the movement of the pitman and of the pin 57, but otherwise have no part in driving the link 64 or rocking the shaft 67. In certain prior devices the pitman or connecting rod oscillates a rocking lever, being pivotally connected thereto at one point, and said rocking lever in turn drives a connecting link which is pivoted thereto at a different point and the other end of which rocks the shaft. In other prior constructions, a bell crank lever is used instead of the rocking arm just referred to, the pitman or connecting rod being connected to one arm of the bell crank lever and the other arm thereof, which is arranged at an angle to said first arm, drives the connecting link which rocks the shaft.

The double rocker arms 66 are pivoted at their upper ends so that their lower ends swing back and forth through the arc of the dotted line circle shown in Fig. 8. For the sake of illustrating the shape of said rocker arms 66, the location of the connecting pin 65 and the end of the connecting rod 64, the section of these parts, as shown in Fig. 7, is taken with said crank arms in the extreme left hand position of their swinging movement, instead of in the position shown in Fig. 8 in which said parts would be largely concealed beneath the shaft 67. The ends of said shaft extend through the housing and have suitable crank arms 68 thereon which connect with driving links 69, extending to the trough 70.

When the parts are in motion, the axis of the pin 57, which is the point of connection between the pitman 55 and the link 64, travels back and forth in an open path as shown by the dotted lines and arrows in Fig. 8. The upper and the lower dotted lines are separated a considerable distance, vertically in this case, due to the design and arrangement of the mechanism and more particularly to the distance apart of the two pins 57 and 59, carried by the pitman. As the location of these pins approach each other, in other designs, the distance between said two dotted lines decreases, and in the description of the figures immediately following, said distance becomes very much less. As elsewhere stated, there are conditions under which the axes of the two pins may coincide.

Figs. 12 and 13 illustrate a somewhat different commercial form of the invention in which the driving gear 71 carries a similar pin 72 on which the pitman 73 is mounted, the other end of said pitman carrying a pin 74 non-rotatably fixed therein by a small locking pin 75. This pin has a cylindrical extension 76, 76, at each end, said extensions being aligned with each other but arranged eccentrically with respect to the axis of the pin 74. Double rocker arms 77 extend upwardly from the hub 78 which unites them, the rocker arm as a whole including the hub, being mounted on the shaft 79 having suitable bearings in the side walls of the housing. The upper ends of said rocker arms have aligned openings therein which receive the eccentric extensions 76. Thus the rocker arm guides the left hand end of the pitman (as viewed in Fig. 13) in its back and forth movement. The pin 74, being non-rotatably mounted in said pitman, is in effect an integral part thereof and hence the eccentric extensions 76 are, in effect, parts of said pitman.

The connecting link 80 has an opening at one end which receives the pin 74 and thus is driven by the pitman through said pin, as though the latter were an integral part of said pitman. The other end of said link 80 is connected by a pin 81 to the double rocker arms 82 which are united at their upper ends by the hub 83, the latter being mounted on the shaft 84 which serves to rock the arm 85 on one end thereof, the latter being connected to the trough.

As in the case of Fig. 7, the showing of the rocker arms 82 in Fig. 12 and of the arm 85, does not represent the same angular position as in the diagrammatic showing of these same parts in the corresponding Figs. 8 and 13. It will be seen that as the pitman 73 moves back and forth and changes its angular position with respect to the gear 71 on which it is mounted, the pin 74 rocks back and forth slightly with respect to the end of the link 80 which immediately surrounds it, and thus results in a double path of travel of the center or axis of said pin 74, which is also the point of connection of the pitman to the link 80.

The dotted lines in Fig. 13 show this path of travel and it will be noted that the upper and lower lines are much closer than the corresponding dotted lines in Fig. 8. This makes it desirable, from a construction standpoint, to use a single pin with eccentric extensions rather than two independent pins, although with other designs it is possible to employ separate bearing members or pins, for the parts in question.

Figure 14:
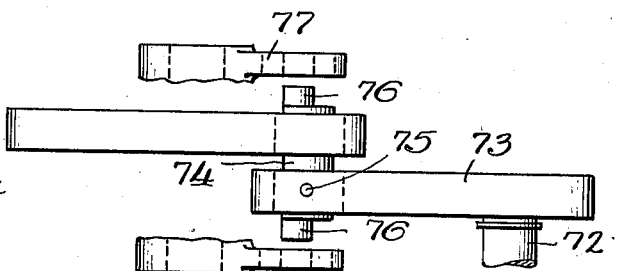
Fig. 14 is a plan view of certain of the parts illustrating the assembly.
Figure 15:
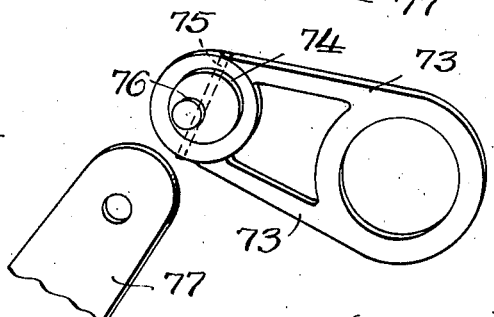
Fig. 15 is a perspective view of some of the same parts.

The form and relative arrangement of said parts may be more readily understood from an examination of Figs. 14 and 15, in which the rocker arms 77 are broken away from the hub and spaced apart to show the method of assembly over the cylindrical extensions 76. Some of these same parts are shown in Fig. 15 in perspective.

I claim:

1. Apparatus of the character described for reciprocating a conveyer trough to cause material to move therealong, including: a shaft adapted to be power rotated; a crank arm on said shaft; a link; a connecting member pivotally connected at one point to said crank arm and at a second point to one end of said link; guide means for said member connected thereto at a third point spaced from either of said two first mentioned points and so constructed and arranged that said third point travels always in one path but said second point follows a different path during one-half of the cycle of rotation of said arm than during the other half, said three points being triangularly arranged, with said third point farther from said first point than is said second point; and a rocker arm pivoted intermediate its ends, and connected on one side of said pivot to the other end of said link and connected on the other side of said pivot to said trough, whereby rotation of said crank arm effects reciprocation of said trough in substantially equal intervals of time for the forward and return strokes, the velocity of said return stroke differing in certain portions thereof from the velocity of the forward stroke.

2. In a shaker conveyer, in combination, a crank, a rocker arm, a link connecting said crank and rocker arm and having two pin bearings thereon, including a single pin having reduced ends eccentrically located with respect to the main axis of said pin, a second rocker arm and a connecting rod connected to said second rocker arm at one end and to one of said pin bearings at the other end, the other pin bearing connecting said first rocker arm and said link.

3. In a shaker conveyer, in combination, a motor driven gear, a crank pin projecting laterally therefrom, a pitman mounted near one end thereof on said crank pin and having a bearing pin fixed in and projecting laterally from the other end, a link rotatably mounted at one end on said fixed pin, said pin having oppositely extending aligned portions of reduced diameter at its ends, said reduced portions being eccentric with respect to the axis of said pin, a pair of rocker arms fitting over said eccentric portions and pivotally mounted below the same, a conveyer actuating rocking shaft, a pair of rocker arms secured thereto and depending therefrom, and a pin connecting the lower ends of said arms to the other end of said link.

4. In a shaker conveyer, in combination, a crank, a rocker arm, a link connecting said crank with said rocker arm, a second rocker arm, a link connecting said second rocker arm to rock with said first rocker arm at a different angular velocity than said first rocker arm, the connection between said first and second links to said first rocker arm including a member pivotally connected with said first rocker arm for pivotal movement about one axis and pivotally connected with said second mentioned link for movement about an axis eccentric of said first axis, but concentric with the axis of connection of said first mentioned link thereto.

5. In a shaker conveyer, in combination, a crank, a rocker arm, a link connecting said crank with said rocker arm, a second rocker arm, a link connecting said second rocker arm to rock with said first rocker arm at a different angular velocity than said first rocker arm, the connection between said first and second links to said first rocker arm including a member pivotally connected with said first rocker arm for pivotal movement about one axis and pivotally connected with said second mentioned link for movement about an axis eccentric of said first axis, but concentric with the axis of connection of said first mentioned link thereto, and a fixed connection between said member and said first mentioned link to hold said axes in fixed relation with respect to each other during reciprocation of the conveyer.

6. In a shaker conveyer, a crank, a rocker arm adapted to be connected to a conveyer trough line, two links pivotally connected together, a pivotal connection from one of said links to said crank, a pivotal connection from said other link to said rocking member, for reciprocably driving said rocking member upon rotation of said crank, and means for guiding the point of connection of said links together, to cause said point to follow one path during the forward stroke of the conveyer and a different path during the return stroke of the conveyer including a rocking member and a single connecting member forming a means for pivotally connecting said links together, said connecting member having pivotal connection with said rocking member eccentric of the point of connection of said links together.

7. In a shaker conveyer, a crank, a rocker arm adapted to be connected to a conveyer, two links pivotally connected together, a pivotal connection from one of said links to said crank, a pivotal connection from said other link to said rocking member, for reciprocably driving said rocking member upon rotation of said crank, and means for guiding the point of connection of said links together to cause said point to follow one path during the forward stroke of the conveyer and a different path during the return stroke of the conveyer including a rocking member and a single connecting member forming a means for pivotally connecting said links together, said connecting member having pivotal connection with said rocking member eccentric of the point of connection of said links together, and a member fixedly connecting said connecting member with one of said links to hold the axes of connection of said links together in fixed relation with respect to the axis of connection of said connecting member to said rocking member, during reciprocation of the conveyer.

FRED R. WILBER.